Oct. 29, 1929.   C. A. WRAGG   1,733,928
AIRCRAFT
Filed May 18, 1923   2 Sheets-Sheet 1
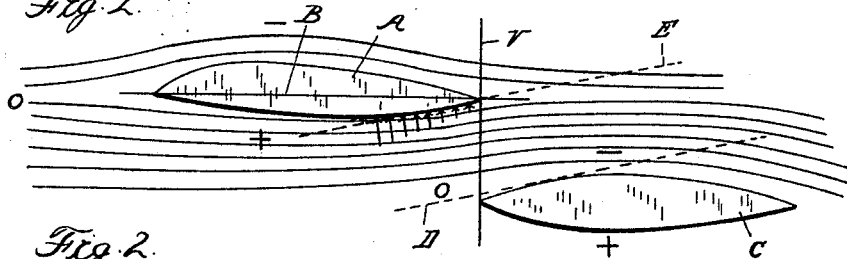
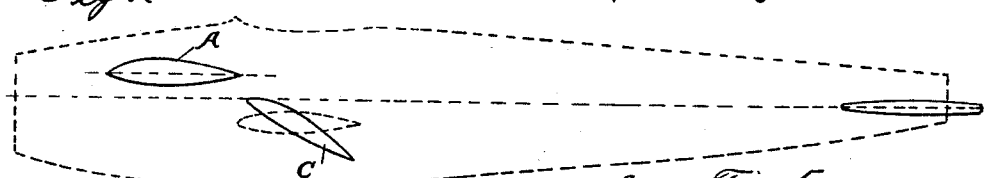
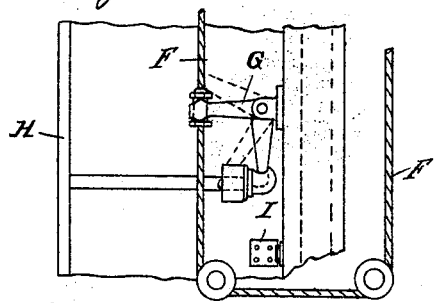
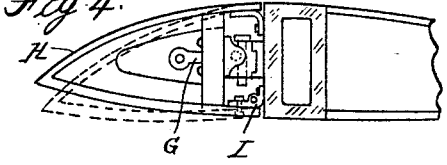
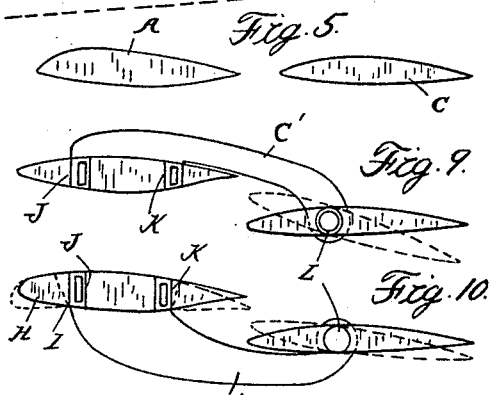
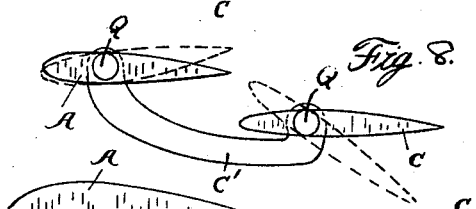
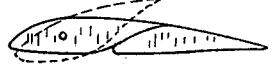
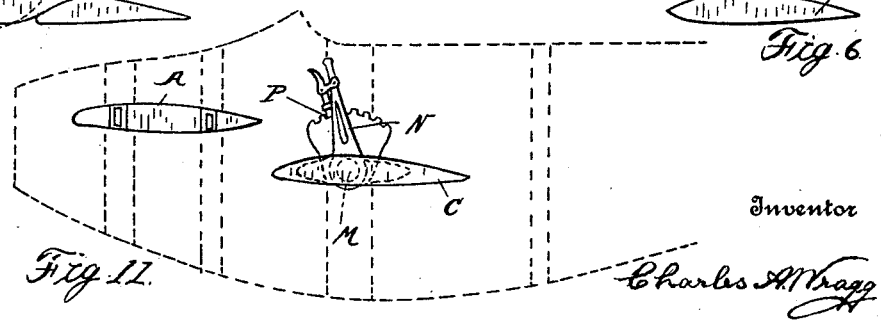
Inventor
Charles A. Wragg

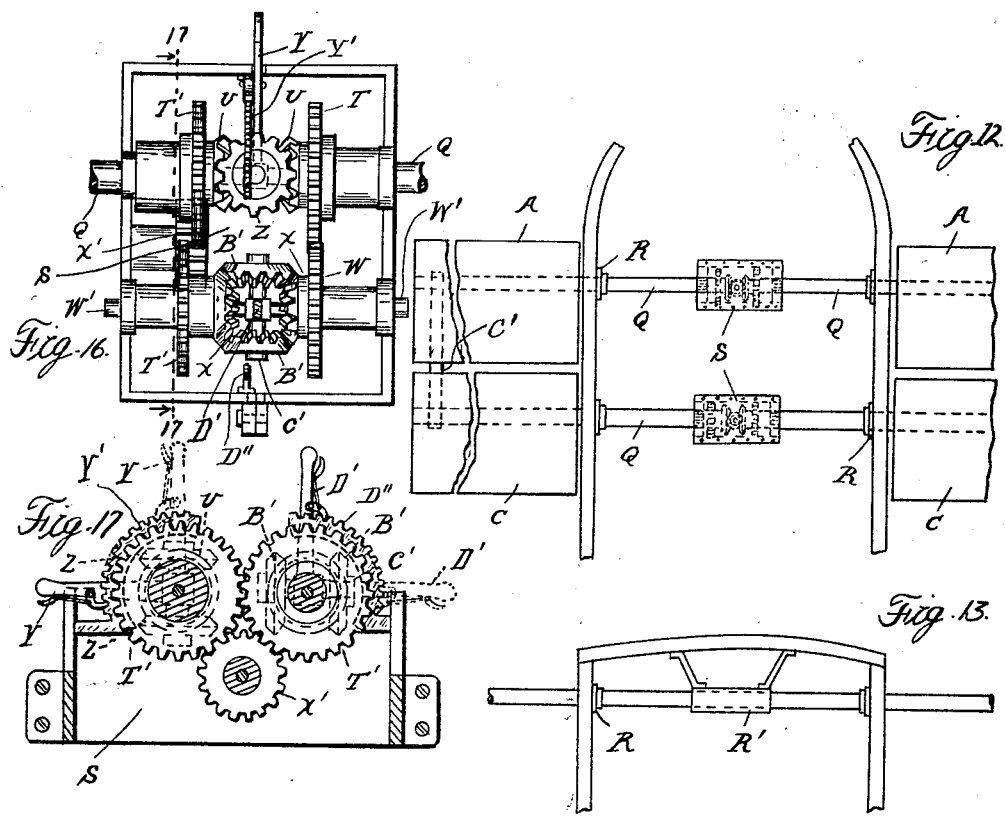
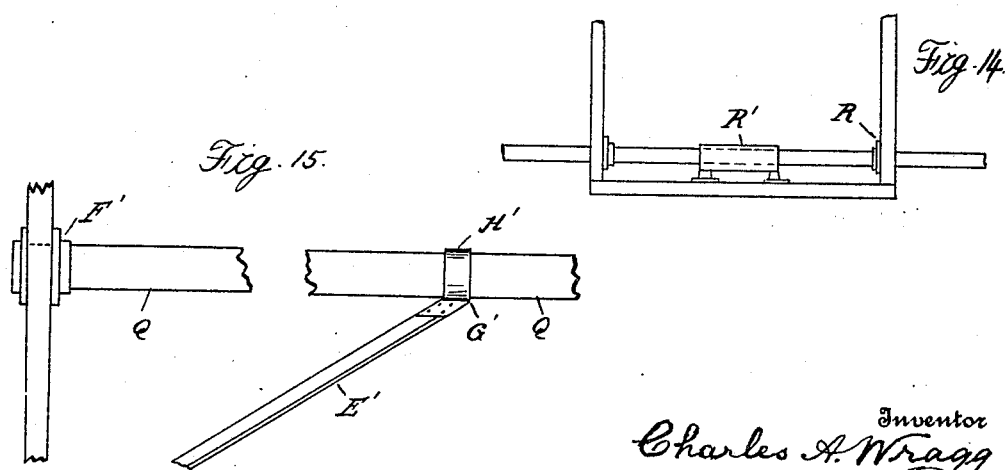

Patented Oct. 29, 1929

1,733,928

UNITED STATES PATENT OFFICE

CHARLES ARTHUR WRAGG, OF WASHINGTON, DISTRICT OF COLUMBIA

AIRCRAFT

Application filed May 18, 1923. Serial No. 639,811.

This invention relates mainly to the wings and vanes of aircraft, particularly to the supporting surfaces of airplanes and flying boats.

As the growing demand that airplanes shall be capable of carrying greater useful loads for postal and commercial purpose is making the problem of efficiently and compactly arranging the increasing amount of surface area required more and more difficult, and as it is desirable in some designs to embody all the load-carrying wires and struts inside the wing, I divide the usual monoplane unit of surface area into two sections arranged one behind the other as illustrated in Fig. 1 in order to enable a larger degree of supporting surface to be used in one machine.

The wings are thick in cross-section, especially where attached to the body, so that the cantilever principle of construction may be used; and it will be observed that about .4 of the rear portion of the lower surface of the forward section (A) is directed upwards in a pronounced way towards the trailing edge so that the lower ordinates of that part of the wing are virtually equal to or greater than the upper ordinates of the rear portion of the wing as measured from a datum line (B) connecting the leading and trailing edges.

It will also be seen that the front portion of the rear wing (C) has such a relation to the rear portion of the forward one that if lines were drawn tangent to the surfaces as shown at (D) and (E) they would be approximately parallel, or diverging rearwardly, to form a funnel-like opening or valve space in the gap between the wings through which the air passes freely. This tangent relationship, however, is merely a method of describing a preferred structure and is not intended to limit the type of trailing wing. In my invention, wing C, especially in designs in which it has a smaller chord than wing A, may be quite rounded at the nose.

The effect of this combination and relation of parts of the surfaces of thick wings is that the air-pressure is allowed to drop off steadily where shown by arrows (representing vectors which indicate a progressive reduction of pressure) toward the trailing edge of the forward wing, thus allowing the lower airstream to meet the more rapidly flowing and less dense upper air stream and trail off with minimum disturbance.

One of the effects of such a contour of the lower surface when in the combination described is that a thick wing may be designed which is not necessarily a "high-lift" wing (which limits the maximum speed attainable) and the upper curve does not have to slope down so steeply toward the training edge thus giving less downward sweep to the upper air stream. This results in less turbulence when the upper and lower streams meet and affords a more desirable condition of flow in which a rear wing may efficiently function.

I have found by experiments in wind tunnels that when A modified as described is placed on the balance, and another wing set in position as at C but not on balance, with small vertical gap and little or no decalage, its effect on A is to raise the efficiency and to cause the peak of the efficiency curve to move toward lower lift coefficients, and at high angles the maximum lift is considerably increased for landing.

The influence of the rear wing (C) on the air-flow extends ahead beyond its leading edge and causes the air to flow smoothly up the declining lower surface of the forward wing without turbulence of the streamlines. Thus the two wings coordinate in advantageously affecting the airflow. In brief, the general condition of the air about the wings may be described as being somewhat rare or of lower density above the wing, indicated by the minus sign —, and of somewhat increased pressure or greater density below the wing, indicated by the plus sign +, as compared with the normal air-pressure, indicated by the zero sign 0. The stratum of air flowing under the wing is first given the plus sign, then it is restored to normal or nearly normal by reason of the relationship of the contours of the sections, and then it is divided by the rear wing so that the upper and lower strata take the minus and plus signs respectively as shown in Fig. 1. At extremely high speeds the regions indicated by plus signs in Fig. 1 may not be of greater density than the normal air condition, indicated by O, but they nevertheless remain plus with reference to the more rarified air streams above, where-indicated by the minus signs.

In the drawing, Fig. 1, the rear wing is shown set below the forward wing to a distance about .33 chord of the forward wing and with its leading edge on a vertical line (V) touching the rear edge of the forward wing, but it should be understood that the rear wing may be set in any position relative to the front one providing it is within the scope of the airflow affected by the forward wing coordinating with the rear wing as described. It may be set lower than indicated in Fig. 1, or higher as shown in Figs. 5 and 6, or it may be set with its leading edge in front of or to the rear of the trailing edge of the forward wing and still be within the prescribed zone. The pressure vectors are intended to show the effect only at the point of contact with the wing surface, but the air is affected for a considerable distance below and to the rearward of a wing, normal pressures being gradually reached as the distance is increased.

The objective in the well known staggered biplanes, tandems and multiplanes generally has been to keep auxiliary surfaces away from the affected region because the way to properly modify and utilize this region has hitherto not been known.

The cross-section of the rear wing, although indicated as a streamline form in the drawing, may be of any type in my invention. In Figs. 9 and 10 I show additional forms of suitable wings. In my copending application Serial No. 264,365 applying to thin wings, greater freedom of choice of cross-sections would naturally be permissible because of their thinness.

The exact position of the rear wing in relation to the forward one in actual designs depends upon several variable factors such as the length of chord, the relative angles of incidence and the cross-section. In practice designers and engineers, after determining whether they wish to embody very thick wings or wings of only medium thickness, may make a laboratory model, following the principle herein disclosed that the thicker the section the more pronounced should be the general upward direction of the lower rear portion of the forward wing, and then test the particular combination selected in a wind tunnel as in ordinary practice for design data and positions of maximum efficiency.

I also provide means for tilting the wings by pivoting at the main spar in order to vary the angle of incidence as shown in Figs. 2 and 7 to 12. With wings characterized as above the lifting power can be more effectively increased for climbing and landing than is the case with other types of wings by bringing the leading and trailing edges of the forward and rearward one respectively closer as shown in Figs. 2 and 9 to 10. The machine, when landing, may then be tilted by the use of the elevator as customary until the angle of maximum lift is reached. It should be understood that in my preferred structure although the forward wing may have a less angle than the rear one at such times it is not set at a negative angle in relation to the tail surface or the horizontal axis of the machine as such a practice tends to cause instability and increased resistance. The relationship preferred is shown in Fig. 2 in which the wing (A) is approximately parallel to the horizontal axis but it may also normally be at a positive angle thereto However, as a general effect of the adjustment in my structures is to cause a pronounced increase in the positive dihedral between the wing as a whole and the tail, the forward wing may also be angularly adjusted as shown in Figs. 7 and 8, especially when an adjustable stabilizer is used on the machine.

I may also provide means for adjusting the front portion of the forward wing as shown in Figs. 4 and 10 wherein a wire (F) operated by a control in the pilot's cockpit pulls a bell crank (G) which turns the nosepiece (H) down on hinges (I). And I may also adjust the trailing portion of the forward wing as shown in Fig. 10 and described and illustrated in my aforesaid application Serial No. 264,365.

In order to rigidly brace the wings in relation to each other I provide one or more braces or external web C' above or below the wings at a point between the outer extremity of the span and the body as illustrated in Figs. 9, 10 and 12. This web is rigidly fixed to the spar or spars in the forward wing at J—K and pivotally connected at (L) to the main spar of the rear wing, and it is so shaped as not to interfere with the free movement of the adjustable portions of the wing system. When the forward wing is tiltably constructed the web is also pivoted about the main spar of the forward wing as shown in Fig. 8.

Fig. 11 shows a method of making a simple angular adjustment of the rear wings when they are not designed to be used also as balancing members. The balanced rear wing (C) is pivotally connected to the fuselage at (M) and angularly adjusted by the lever (N) which is kept locked in any desired position by the ratchet (P).

In my preferred structure the spar of the wing is continued through the body of the machine, being pivotally mounted on both sides of the body at (M), Fig. 11, but the spars may abut at the sides of the body and may be either pivotally connected thereto so as to allow of rotation, or they may be rigidly connected to the body and the wings constructed to rotate about the spars.

In Fig. 12 I show a construction in which the spars (Q) abut in the center of the machine, having bearings at their ends to take the stresses with minimum frictional resistance to rotation, and passing through bearings (R) attached to the sides of the body or fuselage. In machines in which the spars are continuous bearings (R') may be used for additional support. The said bearings (R and R') may be attached to the upper or lower portion of the body as illustrated in Figs. 13 and 14, according to whether the machine is to be a high-winged type or a low-winged type.

With this pivotal arrangement, any one of the wings may be tilted for lateral control, or they may be rotated in any combination of pairs as for instance the two on one side may be operated simultaneously, or the front pair, or the rear pair, or a front wing on one side may be tilted in conjunction with the rear one on the other side. Thus at high speeds one wing or one pair may be used for balancing, and at low speeds all four may be used, according to the exigencies of flight.

In order to facilitate the simultaneous operation of the control for balance with the adjustment for variation of lift so that a pair of wings may be continuously increased or decreased in angle while at the same time being capable of changing their angles in relation to each other for the purpose of equalizing lateral air disturbances, I provide a double-differential gear connected to the wing spars as shown at (S) in Fig. 12 and illustrated in detail in Figs. 16 and 17. In this double differential mechanism I affix to the inner end of each one of the spars (Q) a bevel gear (U) and mount between them the usual pair of differential bevel-pinions (Z), these pinions (Z) being journaled in the lower ends of a lever (Y). Affixed to one of the spars (Q) is a gear (T), and meshing with this gear is another gear (W), this latter gear being affixed to one of the shafts (W') of an auxiliary differential. Affixed to these two shafts (W') respectively are the auxiliary differential bevel-gears (X). The two differential bevel-pinions (B') are journaled on the lower ends of a lever (D').

On the other spar Q is affixed a gear T' which is connected through the medium of the intermediate pinion X' to a companion gear T' affixed to the other shaft W'. The lever D' is locked in its adjusted position by means of a notched rack D'' cooperating with the pawl carried by the lever; and the other lever Y is similarly locked by means of a similar rack Y'.

With the foregoing differential arrangement, it will be observed that by swinging the lever Y the two wings may be tilted in unison in either direction; or by swinging the lever D' the two wings may be simultaneously tilted in opposite directions, or by operating both levers simultaneously, both the foregoing operations may be accomplished simultaneously. It will be understood that the levers Y and D' may be positioned in any suitable way to suit the positions of the controls, the arrangement illustrated being merely for the purpose of clearly showing the parts.

In the case of wing constructions which rotate about rigidly fixed spars the axles (Q) of the primary differential are connected by suitable rods or wires to the wings for the purpose of rotating the wings about their spars.

Any standard lateral control member may be used in connection with these movements, such as the stick or wheel control connected to wires or tubes running to the movable lever (D').

The wing spars (Q) may be pivotally supported, by ordinary engineering methods, at or near the outer extremities, or half way thereto, by an attachment at the end of the regulation load-carrying strut or wire. Fig. 15 is a sketch illustrating the attachment of a brace (E') to a spar which is constructed to abut at the fuselage and is pivotally mounted at (F'). The wing surface is pierced at (G') to allow of attachment of the brace member to a bearing or clip (H') on the spar (Q).

I do not desire to be understood as limiting myself to the precise details of construction and arrangement shown, as variations and modifications therefrom may be made without departing from the spirit and scope of my invention and improvements. I therefore reserve the right to all such variations and modifications as properly fall within the scope of my invention and improvements and as set forth in the terms of the following claims.

What I claim is:

1. In an aircraft structure of the class described, a forward and a rearward wing surface, the trailing portion of said forward surface having an upwardly-extending undersurface, the entering portion of the rear surface having its upper surface slightly convex, said wing surfaces pivotally mounted on transverse axes.

2. In an aircraft structure of the class described, an upper and a lower air-supporting surface, the trailing portion of said upper surface having an upwardly-extending undersurface, the entering portion of the lower wing having a slightly upwardly-rounded surface and the entering edge of said lower wing being in substantially vertical alinement with the trailing end of said upper wing, said surfaces pivotally mounted for relative movement upon transverse axes.

3. In aircraft, wings arranged one behind and below another with a space between not greater than half the chord of the forward wing supported relatively to each other by a brace towards the tips of the wings.

4. In aircraft, wings arranged one behind and below another with a space between not greater than half the chord of the forward wing supported relatively to each other by a brace attached to two spars in the forward wing and connected with a spar in the rear wing.

5. In an aircraft structure of the class described, a forward thick wing and a rearward wing, the trailing portion of said forward wing having an upwardly-extending undersurface, said rearward wing having its leading edge close enough to the trailing edge of said forward wing to produce a Venturi effect between the upwardly-extending undersurface of said forward wing and said rear wing.

6. The structure according to claim 5, having the front portion of said forward wing adjustable.

7. The structure according to claim 5, having the rear portion of said forward wing adjustable.

8. The structure according to claim 5, said rear wing being adjustable about a transverse axis.

9. The structure according to claim 5, having the leading and trailing portions of said forward wing adjustable in combination with angular adjustment of said rear wing.

10. In aircraft, a compound wing comprising a forward thick wing and a rearward wing with a gap between not greater than half the chord of said forward wing, the trailing edge of said forward wing being in substantially the same vertical plane as the leading edge of said rearward wing, in combination with a tail surface.

11. The structure according to claim 10, said rearward wing having less lift than said forward wing.

In testimony whereof I hereunto affix my signature.

CHARLES ARTHUR WRAGG.